United States Patent [19]
Kobayashi

[11] Patent Number: 5,739,761
[45] Date of Patent: Apr. 14, 1998

[54] VEHICULAR CONTROLLER

[75] Inventor: Masayuki Kobayashi, Anjou, Japan

[73] Assignee: Nippondenso Co., Ltd., Kariya, Japan

[21] Appl. No.: 587,446

[22] Filed: Dec. 1, 1995

[30] Foreign Application Priority Data

Dec. 2, 1994 [JP] Japan ..................... 6-300012

[51] Int. Cl.$^6$ ............. B60R 16/02; B60R 21/08; B60R 25/04
[52] U.S. Cl. ............... 340/825.16; 340/825.06; 340/459; 364/424.034; 364/424.04; 307/9.1; 307/10.1; 370/221; 395/182.01; 395/182.11
[58] Field of Search .................. 340/825.16, 459, 340/825.06; 307/9.1, 10.1; 364/424.034, 424.04; 324/380, 384; 370/221; 395/182.01, 182.11

[56] References Cited

U.S. PATENT DOCUMENTS

| | | | |
|---|---|---|---|
| 4,584,487 | 4/1986 | Hesse et al. | 307/10 R |
| 4,667,176 | 5/1987 | Matsuda | 340/52 F |
| 4,837,454 | 6/1989 | Ishii et al. | 307/10.1 |
| 5,381,334 | 1/1995 | Furui | 364/424.03 |
| 5,424,584 | 6/1995 | Matsuda et al. | 307/10.1 |
| 5,561,332 | 10/1996 | Udo et al. | 307/10.5 |
| 5,583,770 | 12/1996 | Sekido et al. | 364/424.045 |

FOREIGN PATENT DOCUMENTS

| | | |
|---|---|---|
| 62-3540 | 1/1987 | Japan. |
| 6-32156 | 2/1994 | Japan. |

*Primary Examiner*—Michael Horabik
*Assistant Examiner*—Yonel Beaulieu
*Attorney, Agent, or Firm*—Cushman Darby & Cushman IP Group of Pillsbury Madison & Sutro LLP

[57] ABSTRACT

A vehicle is equipped with an engine control ECU, an anti-lock brake system control ECU, a transmission control ECU and a meter control ECU. Each ECU shares information with the others by communicating and by performing mutual malfunction diagnosis operations through communication; also, backup operations are performed. After the deactuation of the ignition switch, malfunction diagnosis operations are prohibited by prohibiting communication between the engine control ECU which is supplied with electric power and the other ECUs which are not supplied with electric power. After the deactuation of the ignition switch, when a predetermined time lapses after the actuation of the ignition switch from the state wherein the ECU is supplied with power, prohibition on communication with ECUs is released.

13 Claims, 5 Drawing Sheets

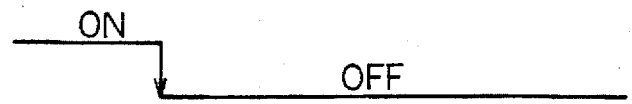
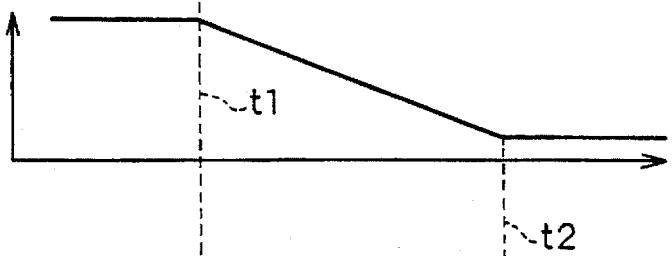
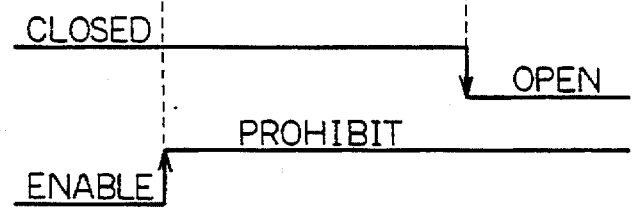
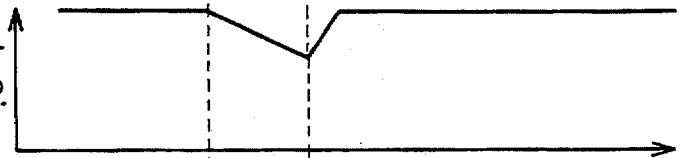
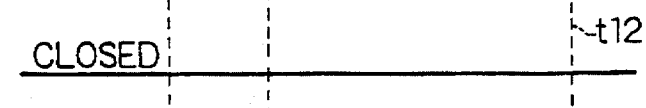
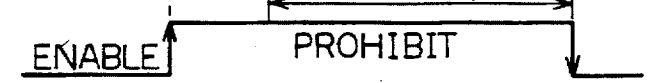

VEHICULAR CONTROLLER

CROSS-REFERENCE TO RELATED APPLICATION

This application is related to and claims priority from Japanese Patent Application No. Hei-6-300012, the contents of which are hereby incorporated by reference.

BACKGROUND OF THE INVENTION

1. Field of the Invention

The present invention relates to a vehicular controller. More specifically, it relates to vehicular controllers using distributed processing systems for implementing control of fuel injection, anti-skid braking, and the like.

2. Description of Related Art

In recent years, with advancements in car electronics, plans for vehicular networking computers are being drawn up. Thus, by networking a plurality of electronic control units or ECUs mounted on a vehicle, information can be shared by performing communication operations; moreover, backup operations can be executed when a malfunction is diagnosed during mutual malfunction diagnostic operations. Concretely, this mutual malfunction diagnosis, in which an operation confirmation message is prepared for checking if a ECU is working properly or not, involves determining whether or not each ECU is working properly by checking if the operation confirmation message and an ID (identification) number, which is assigned to each ECU, sent by an ECU to all the other ECUs at every predetermined period of 200 ms, has been received for at least one time within 500 ms by all ECUs other than the ECU which sent the message. Also, concretely, when the operation confirmation message, which can be normally received twice within a 500 ms interval, cannot be received, the backup operation during malfunction determines that the ECU bearing the ID number of the message is irregular and avoids irregular control caused by the receipt of erroneous messages by setting all data received from such an ECU to a default value (standard value).

On the other hand, to prevent engine overheating and to improve restartability of the engine, the cooling fan is also driven for a predetermined time after the deactuation of the ignition switch and this function is provided in the above-described ECU. For this case, the ECU is supplied with electric power even after the deactuation of the ignition switch.

However, if the engine control ECU and the transmission control ECU are networked and the engine control ECU is provided with the cooling fan control function, because the engine control ECU is receiving electric power while the transmission control ECU is not being supplied with electric power immediately after the ignition switch is deactuated, the operation confirmation message from the transmission control ECU cannot be received by the engine output torque computation procedure for the engine control ECU. Accordingly, the backup default value (standard value) is set as the value of a gear position data which is the data sent by the transmission control ECU. Then, torque computation is executed based on this default value and thus, for example, even if the gear position is actually in the D range, the engine output torque becomes an erroneous amount because it is computed at the default value (standard value) which is the N range. As a result, for a predetermined time after the deactuation of the ignition switch (during the actuation of the cooling fan), engine output torque control (fuel injection amount control, ignition time control) becomes unstable while the engine is in operation.

SUMMARY OF THE INVENTION

In consideration of these problems, it a goal of the present invention to provide a vehicular control apparatus which prevents backup operations due to erroneous malfunction diagnosis operations.

To achieve this aim, one aspect of the present invention provides a vehicular controller for executing backup operations when there is a malfunction in a plurality of electronic control devices mounted on a vehicle which share information via mutual communication with each other and which perform malfunction diagnosis via mutual communication with each other, wherein such vehicular controller prohibits malfunction diagnostic operations between an electronic control device supplied with electric power and an electronic control device not supplied with electric power after a deactuation of a key switch. In this way, malfunction diagnosis operations are prohibited between an electronic control device supplied with electric power and an electronic control device not supplied with electric power after the deactuation of a key switch.

Thus, malfunction diagnosis operations are not performed and erroneous backup operations are avoided. For example, when the engine control ECU and the transmission control ECU are networked and when the engine control ECU is provided with the cooling fan control function described above, immediately after the deactuation of the ignition switch, the engine control ECU is being supplied with electric power while the transmission control ECU is not receiving electric power. During this time, malfunction diagnosis operations are not performed and torque computation is executed for the computation procedure of the engine output torque of the engine control ECU without using the default value (standard value) and thus, engine output torque is computed properly.

Another aspect of the present invention provides a vehicular controller which prohibits malfunction diagnostic operations by prohibiting communication between an electronic control device supplied with electric power and an electronic control device not supplied with electric power. In this way, communication between an electronic control device supplied with electric power and an electronic control device not supplied with electric power is prohibited in order to prohibit malfunction diagnosis operations.

A further aspect of the present invention provides a vehicular controller for releasing the prohibition on communication with the other electronic control devices when a predetermined time elapses after a key switch is actuated, after being deactuated, when a prescribed electronic control device is being supplied with electric power. In this way, prohibition on communication operations with the other communication devices is released when a predetermined time lapses after an actuation of the key switch, after being deactuated when a prescribed electronic control device is being supplied with electric power. Therefore, the electronic control device does not commence communication operations immediately after the actuation of the key switch and since the communication prohibition is released after a predetermined time has lapsed, erroneous malfunction diagnosis operations are avoided. In short, erroneous malfunction diagnosis operations due to electric power onset operation delays or the like are avoided.

An additional aspect of the present invention is that a vehicular controller prohibits malfunction diagnostic operations by prohibiting subsequent operations after communication between an electronic control device supplied with electric power and an electronic control device not supplied with electric power. Accordingly, malfunction diagnosis operation is prohibited by prohibiting operations subsequent to communication operations between an electronic control device being supplied with electric power and an electronic control device that is not being supplied with electric power.

BRIEF DESCRIPTION OF THE DRAWINGS

Additional objects and advantages of the present invention will be more readily apparent from the following detailed description of the preferred embodiments thereof when taken together with the accompanying drawings in which:

FIGS. 5A–5D are timing charts of the signal receipt prohibition and relay control operations according to the embodiment; and FIGS. 6A–6D are timing charts of the signal receipt prohibition and relay control operations when the ignition switch is actuated while the relay remains closed.

DETAILED DESCRIPTION OF PRESENTLY PREFERRED EXEMPLARY EMBODIMENTS

A preferred embodiment of the present invention is described hereinafter with reference to the accompanying drawings.

Figure 1:
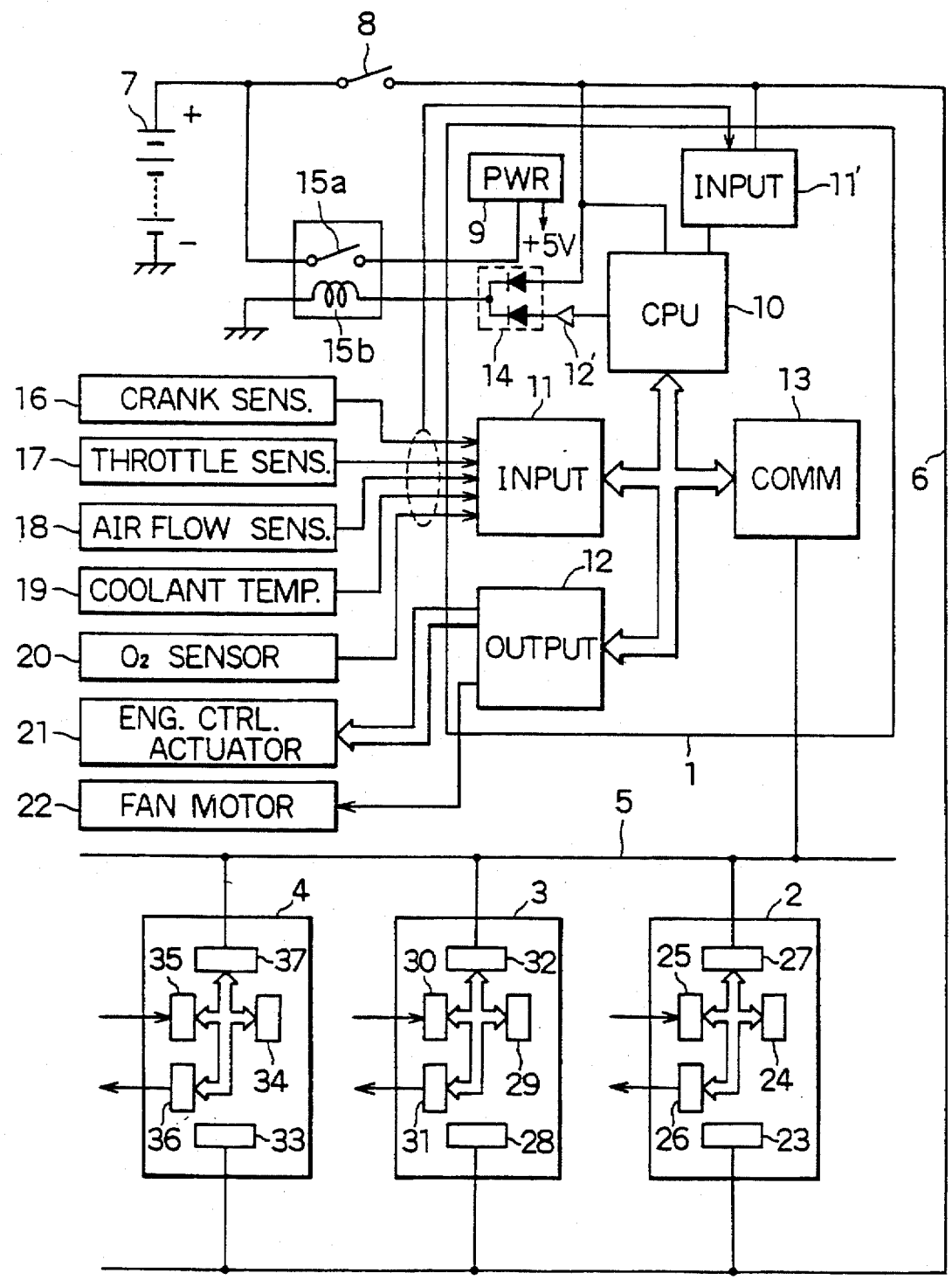
FIG. 1 is a block diagram showing an entire construction of a vehicular control system according to a preferred embodiment of the invention.

FIG. 1 shows an entire construction of a vehicular control apparatus having a plurality of networked ECUs according to the preferred embodiment. The vehicle is equipped with an injector-type spark ignition gasoline engine which is injected with fuel (gasoline) from a fuel injector valve. At the same time, anti-lock brake system and automatic transmission controls are being executed for the vehicle. As shown in FIG. 1, as vehicle-mounted electronic control devices, an engine control ECU 1, an anti-lock brake system control ECU 2, a transmission control ECU 3 and a meter control ECU 4 are mounted on the vehicle with each of the ECUs 1, 2, 3, 4 being able to communicate with the others and nodes being formed by each ECU 1, 2, 3, 4. In short, the four ECUs 1, 2, 3, 4 are connected to each other via a communication line 5. Also, this communication system preferably uses a LAN (Local Area Network) implementing a high-speed protocol for vehicle-mounted systems such as the ISO/DIS 11898 standard that is being standardized by the European International Standards Organization (ISO).

In addition, each ECU 1, 2, 3, 4 is connected to a battery 7 via a power line 6 and thus, each ECU 1, 2, 3, 4 is supplied with electric power from the battery 7 via the power line 6. The battery 7 preferably is a 12-volt battery. An ignition switch (key switch) 8 is provided on the power line 6.

The engine control ECU 1 has an electric power circuit 9, a CPU 10, input circuits 11, 11', an output circuit 12, an output buffer 12', a communication circuit 13 and a logic circuit (OR gate) 14. The electric power circuit 9 is connected to the battery 7 side of the ignition switch 8 via a relay contact 15a of a relay 15. The electric power circuit 9 receives 12 volts from the battery 7 and supplies five volts to each device of the engine control ECU 1.

One input of the logic circuit (OR gate) 14 which includes two diodes is connected to the downstream side of the ignition switch 8 along the electric power line 6. Another input of the OR gate 14 is connected to an output terminal of the CPU 10 through the output buffer 12'. An output terminal of the logic circuit (OR gate) 14 is grounded via a relay coil 15b of the relay 15.

Also, the input circuit 11 is connected to a crank angle sensor 16 which detects the engine rotational speed, a throttle sensor 17 which detects the throttle valve opening, an air flow meter 18 which detects the engine air intake volume, a coolant sensor 19 which detects the engine coolant temperature and an $O_2$ sensor 20 for detecting the oxygen concentration of the exhaust gas of the engine, and receives signals from these sensors. Input circuit 11' is also connected to these sensors for providing signals to CPU 10 on power-up.

The output circuit 12 is connected to various engine control actuators 21 which are for controlling the engine. Such various actuators 21 include fuel injection valves, ignition controllers (ignition coil) and the like. Also, the output circuit 12 is connected to a cooling fan driving motor 22 which drives the cooling fan. The cooling fan is provided along the circulatory path of the engine cooling water. Driving the cooling fan promotes the exchange of heat between the engine cooling water and the air, thus cooling the engine.

The communication circuit 13 is connected to the anti-lock brake system ECU 2, the transmission control ECU 3 and the meter control ECU 4 via the communication line 5. The communication circuit 13 performs data communication with ECUs 2, 3, 4 and stores the necessary data in its internal RAM.

The CPU 10 receives the various detected values from the sensors via the input circuit 11 and using the data sent by the ECUs 2, 3, 4 via the communication circuit 13, the CPU 10 performs fuel injection amount, ignition timing and cooling fan control computations and the like. During these computations, the CPU 10 follows control programs stored beforehand in its internal ROM for storing the above-described the detected values from the sensor signals in its internal RAM and executes the prescribed computations to compute the amount of fuel injection, the ignition timing, the rotation speed of the cooling fan and the like. Then, the CPU 10 actuates the engine control actuators 21 of the fuel injection valve, ignition timing controller (ignition coil) and the like to realize such fuel injection or ignition timing. At the same time, the CPU 10 actuates the cooling fan driving motor via the output circuit 12 to control the cooling fan in accordance with the computed rotation speed.

In addition, the engine control ECU 1 drives the cooling fan for a predetermined time after the deactuation operation (open circuit operation) of the ignition switch 8 to prevent engine overheating and to improve restartability. In short, the engine control ECU 1 performs engine cooling control using the cooling fan even after the deactuation of the ignition switch 8 to improve the startability of the engine when the engine is restarted after stopping it when it became hot during vehicle cruising. For this purpose, the engine control ECU 1 has to be supplied with electric power even after the deactuation of the ignition switch 8. Therefore, the logic circuit (OR gate) 14 and the CPU 10 monitor the electric power line 6 to control the timing for stopping the supply of electric power to the engine control ECU 1. This control method is explained hereinafter.

First, when the ignition switch 8 is actuated (closed circuit), a logic "1" is provided to one of the input terminals of the logic circuit 14 and thus, the output of the logic circuit 14 becomes logic "1". In other words, the output of the logic circuit is of a high level, thus magnetizing the relay coil 15b of the relay 15. As a result, the relay contact 15a of the relay 15 closes, battery 7 supplies electric power to the electric power source circuit 9 of the engine control ECU 1 and the engine control ECU 1 commences operation. Later on, the CPU 10 generates a logic "1" to the second input terminal of the logic circuit 14 through the output buffer 12'.

Next, when the ignition switch 8 is deactuated (open circuit), the output of the logic circuit 14 is kept at logic "1" because of the output of the CPU 10, the relay contact 15a of the relay 15 is not disconnected and thus, the supply of electric power from the battery 7 to the electric power circuit 9 continues. Then, when the output of the CPU 10 to the logic circuit 14 is changed to logic "0", the output of the logic circuit 14 changes to logic "0"; in other words, the output of the logic circuit becomes low-level, thus demagnetizing the relay coil 15b of the relay 15. As a result, the relay contact 15a of the relay 15 is released and the supply of electric power to the electric power control circuit 9 stops. In this way, the engine control ECU 1 is able to control the timing for disconnecting the electric power on its own.

It must be noted here that the engine is operating at a low rotation speed even after the deactuation operation (open circuit operation) of the ignition switch 8.

The anti-lock brake system control ECU 2 has an electric power source circuit 23, a CPU 24, an input circuit 25, an output circuit 26 and a communication circuit 27. The electric power source circuit 23 is connected to the downstream side of the ignition switch 8 of the electric power line 6. Also, the electric power circuit 23 receives 12 volts from the battery 7 and supplies five volts to the various devices of the anti-lock brake system control ECU 2. In addition, the input circuit 25 is connected to a vehicular wheel speed sensor or the like. The input circuit 25 receives a signal from such a sensor which is then provided to the CPU 24. The output circuit 26 is connected to the actuator (the solenoid valve which switches the brake pneumatic pressure of the wheel cylinder) which executes anti-lock brake control. The communication circuit 27 is connected to the engine control ECU 1, the transmission control ECU 3 and the meter control ECU 4 via the communication line 5. The communication circuit 27 performs data communication operations with the ECUs 1, 3, 4 and stores necessary data in its internal RAM.

The CPU 24 has an internal RAM for the temporary storage of data. The CPU 24 stores the detected values provided from the sensors via the input circuit 25 in its internal RAM, together with data signalling whether the condition for anti-lock brake control has been established using the data sent from the ECUs 1, 3, 4 via the communication circuit 27 and determining if the brake pneumatic pressure is to be raised, decreased or held constant when such condition is established. The CPU 24 drives the actuator (solenoid valve) via the output circuit 26.

The transmission control ECU 3 includes an electric power circuit 28, a CPU 29, an input circuit 30, an output circuit 31 and a communication circuit 32. The electric power circuit 28 is connected to the downstream side of the ignition switch 8 along the electric power line 6. The electric power circuit 28 receives 12 volts from the battery 7 and supplies the various devices of the transmission control ECU 3 with 5 volts. In addition, the input circuit 30 is connected to the shift lever switch and the like. The signals from such switches are provided to the CPU 29. The output circuit 31 is connected to actuators which execute transmission control (e.g., transmission shift solenoid valve for automatic transmission, solenoid valves for lock-up pneumatic pressure and clutch pneumatic pressure control).

The communication circuit 32 is connected to the engine control ECU 1, the anti-lock brake system control ECU 2 and the meter control ECU 4 via the communication line 5. The communication circuit 32 performs data communication with ECUs 1, 2, 4 and stores the needed data in its internal RAM.

The CPU 29 includes an internal RAM for temporarily storing data. The CPU 29 stores the shift-lever position data from the switches via the input circuit 30, together with using such data, the vehicular wheel speed (vehicular speed) and throttle aperture data sent from the ECUs 1, 2, 4 via the communication circuit 31 to determine the gear position of the automatic transmission for transmission control. Then, the CPU 29 drives the actuators (e.g., transmission shift solenoid of the automatic transmission and lockup pneumatic pressure and clutch pneumatic pressure control solenoid valves) via the output circuit 31.

The meter control ECU 4 includes an electric power circuit 33, a CPU 34, an input circuit 35, an output circuit 36 and a communication circuit 37. The electric power circuit 33 is connected to the downstream side of the ignition switch 8 which is along the electric power line 6. The electric power circuit 33 receives 12 volts from the battery 7 and supplies the various devices of the meter control ECU with 5 volts. Also, the input circuit 35 is connected to the operation switch and the like, receives signals from such switch and supplies the signals to the CPU 34. The output circuit 36 is connected to the actuators (e.g., speedometer, tachometer, trip meter, fuel gauge, gear position display unit or the like) which execute meter control.

The communication circuit 37 is connected to the engine control ECU 1, the anti-lock brake system control ECU 2 and the transmission control ECU 3. The communication circuit 37 performs data communication operations with these ECUs 1, 2, 3 and stores the necessary data in its internal RAM.

The CPU 34 includes an internal RAM for temporarily storing data. The CPU 34 stores the switch operations data which passes through the input circuit 35 in its internal RAM, together with using such operations data and the data sent from the ECUs 1, 2, 3 via the communication circuit 37 to compute meter control amounts for executing meter control. The CPU 34 drives the actuators (e.g., speedometer, tachometer, trip meter, fuel gauge, gear position display unit or the like) via the output circuit 36.

In this way, because the anti-lock brake system control ECU 2, the transmission control ECU 3 and the meter control ECU 4 receive electric power from the downstream side of the ignition switch 8 of the electric power line 6, the electric power of the ECUs 2, 3, 4 are disconnected when the ignition switch 8 is deactuated.

In addition, the ECUs 1, 2, 3, 4 perform mutual malfunction diagnosis through communication with each other. In other words, an operation confirmation message for checking if an ECU is working properly or not is prepared and this message is sent by each CPU at a constant period of 200 ms together with an ID (identification element) number assigned to each CPU. This data is received by the ECUs other than the ECU which sent such data and the process of determining if each CPU is working properly or not is performed by checking if each CPU other than the one which sent the data received the data one or more times within 500 ms. Then, if the message which normally should be received twice within 500 ms is not received, the ECU having the ID number in the message is determined to be abnormal and all data received from such ECU is set to the default value (standard value). Because of this backup operation during malfunction, abnormal control due to the receipt of erroneous messages is avoided.

Next, the communication operations between each ECU are explained in great detail.

In the communication procedure, each ECU sends data at a constant period with only the CPU needing such data processing the data. For example, the transmission control ECU 3 sends gear position data every 20 ms which is received by the engine control ECU 1 which computes the engine output torque and by the meter control ECU 4 which displays the gear position in the display unit. Also, the anti-lock brake system control ECU 2 sends a vehicular speed signal every 7 ms which is received by each ECU and used as control data. In this way, the ECUs share information through mutual communication.

Figure 2:
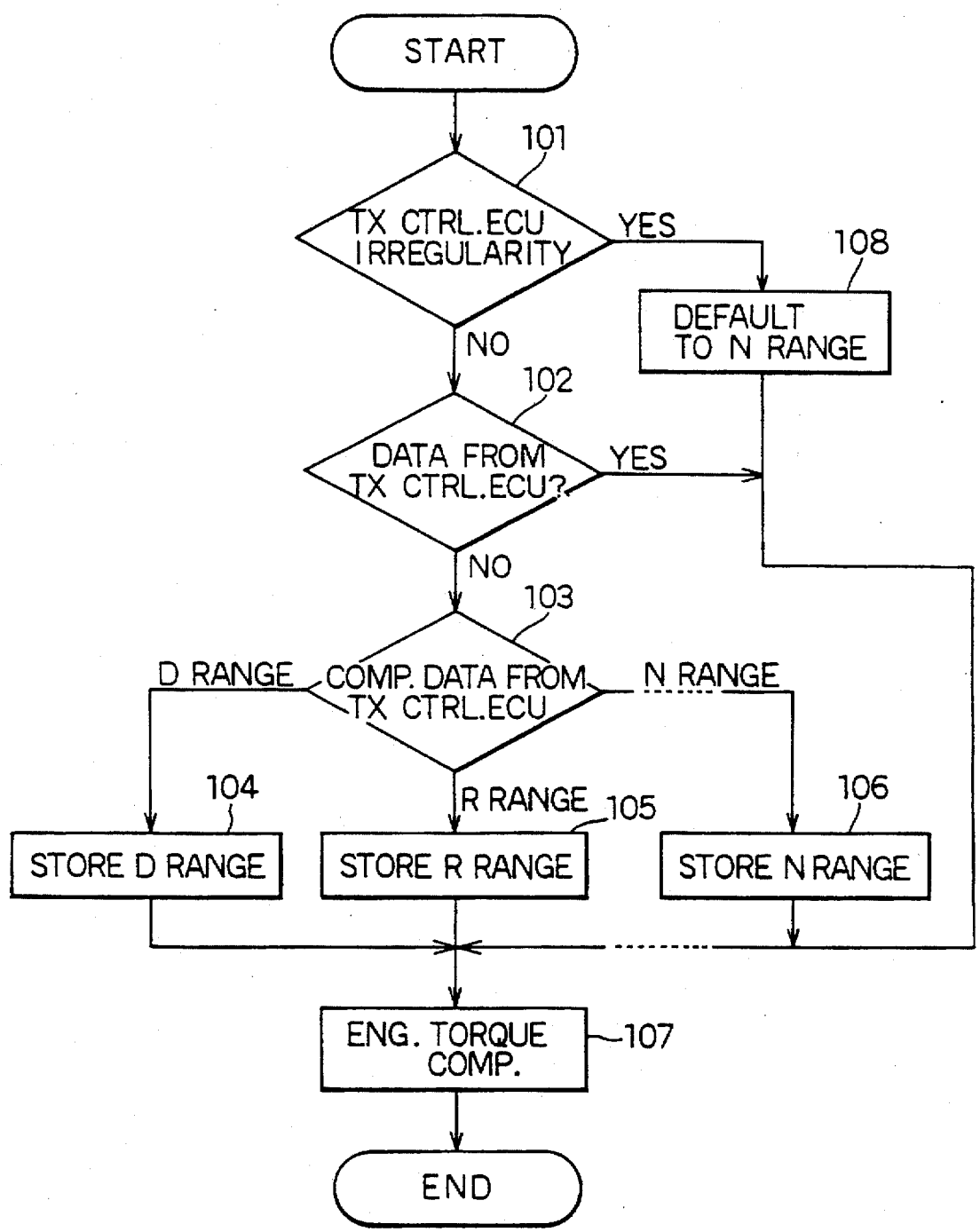
FIG. 2 is a flowchart of the engine output torque computation procedure according to the embodiment.

FIG. 2 shows the flow of the engine output torque computation procedure of the engine control ECU 1.

The CPU 10 computes the engine output torque based on the engine rotation frequency, gear position received from the transmission control ECU 3, the vehicular wheel speed received from the anti-lock brake system control ECU 2 and the like. During this time, when the CPU 10 receives the operation information message from the transmission control ECU 3 within 500 ms and there is no communication irregularity in the transmission control ECU 3, step 101 determines that the data from the transmission control ECU 3 has been received properly and so, control goes to step 102. Then, in step 102, the CPU 10 determines if there is data received from the transmission control ECU 3 and if there is an update in that data (gear position), step 103 determines the contents of the data with steps 104, 105 and 106 updating the gear position data inside the internal RAM. Then, in step 107, the CPU 10 computes the engine output torque based on such gear position.

On the other hand, if the CPU 10 determines in step 102 that there are no data updates, then step 107 computes the engine output torque using the previous gear position.

However, in step 101, if the CPU 10 determines that the operation confirmation message, which can be normally received twice within 500 ms from the transmission control ECU 3, cannot be received, control goes to step 108 which sets the gear position to the N range which is the default value (standard value) of the gear position. Then, step 107 computes the engine output torque based on the N range.

Figure 3:
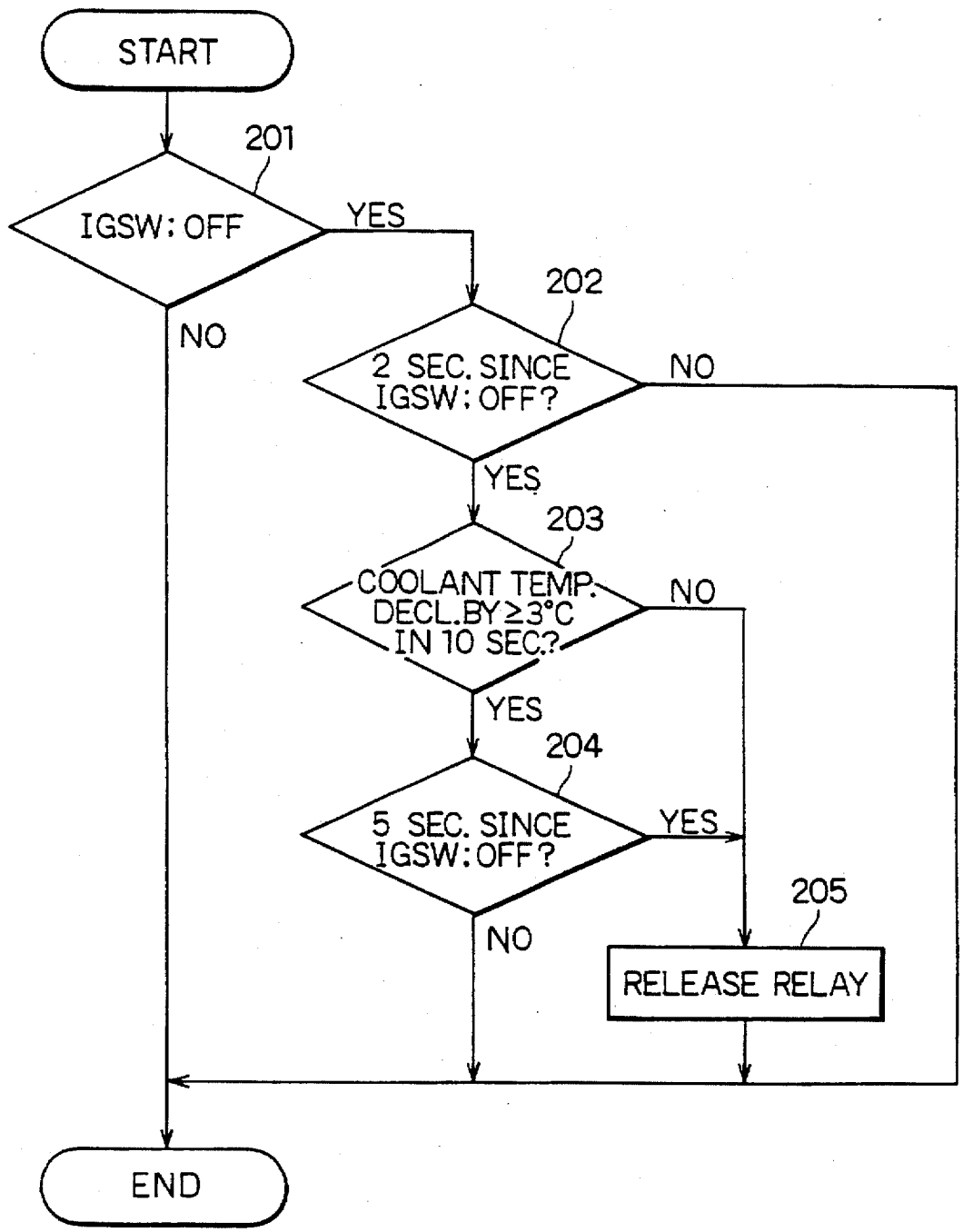
FIG. 3 is a flowchart of relay control according to the embodiment.

FIG. 3 shows the flow of the engine control ECU 1 process for releasing the relay contact 15a of the relay 15.

In step 201, CPU 10 determines if the ignition switch 8 is deactuated or not. Concretely, the CPU 10 monitors the voltage at the downstream side of the ignition switch 8 along the electric power line 6, compares such voltage with a predetermined voltage and determines that the ignition switch 8 has been deactuated when the monitored voltage is not greater than the predetermined voltage. Then, after the deactuation of the ignition switch 8, in step 202, the CPU determines if two seconds have passed since such deactuation. If not, then the CPU 10 terminates the process of FIG. 3. Accordingly, the relay is not deactuated (open circuit) for two seconds after the deactuation of the ignition switch 8. After two seconds have passed since the deactuation of the ignition switch 8, in step 203, the CPU determines if the temperature of the engine cooling water declined by no less than 3° C. in 10 seconds. If so, step 204 determines if five minutes have passed since the deactuation of the ignition switch 8.

If the temperature of the engine cooling water declined by no less than 3° C. in 10 seconds and if five minutes have not yet passed since the deactuation of the ignition switch 8, the CPU is determined to be hot and so, the relay contact 15a of the relay 15 is not released, thereby continuously driving the cooling fan. In this way, the change in the coolant temperature which is used in cooling fan control is determined. When the engine cooling water temperature declines by no greater than 3° C. in 10 seconds, the CPU 10 determines that the engine has cooled and so, in step 205, the CPU 10 releases the relay contact 15a of the relay 15. Also, the CPU 10 releases the relay contact 15a of the relay 15 after the lapse of five minutes after the deactuation of the ignition switch 8 which is the longest time for executing cooling fan control.

Figure 4:
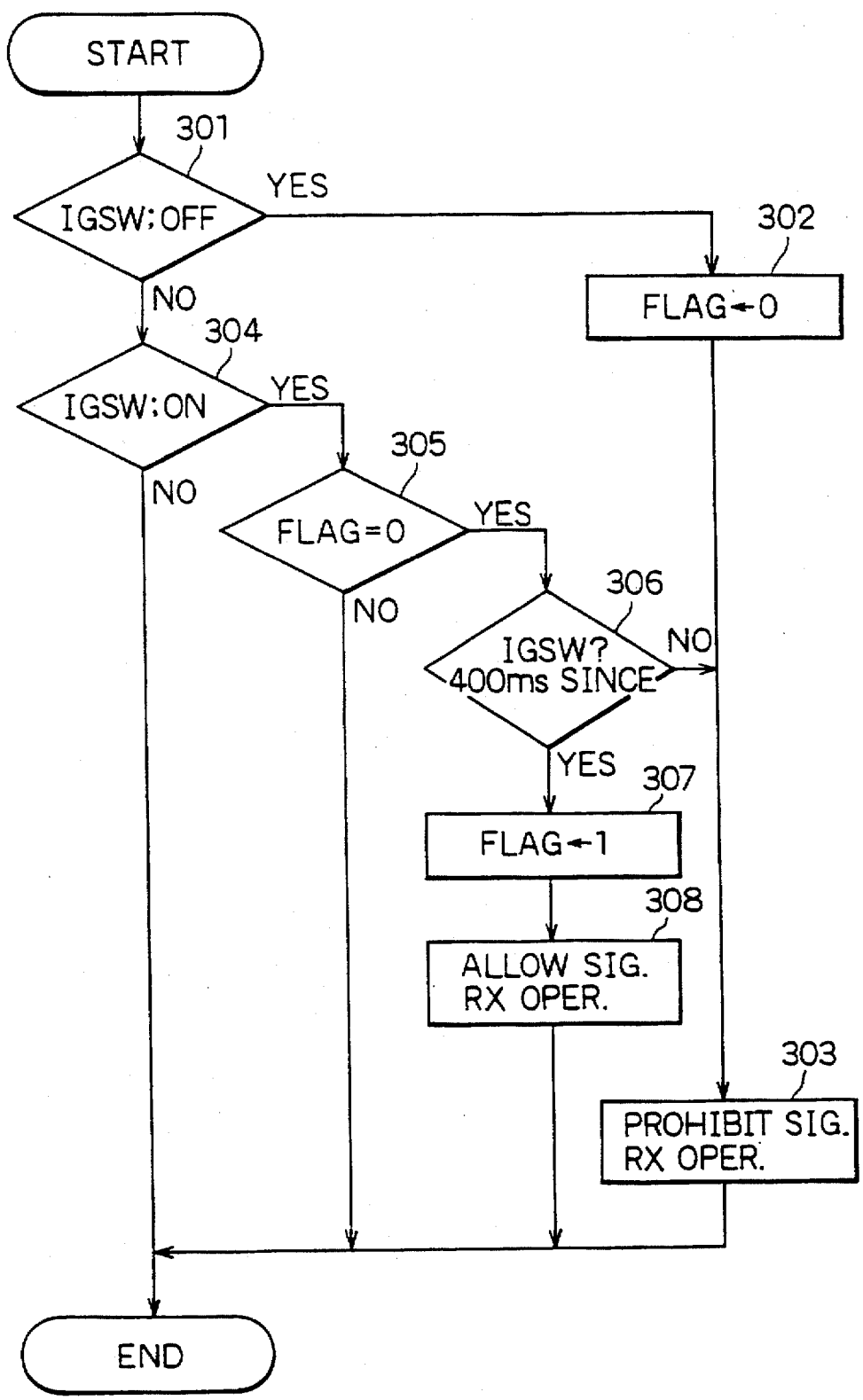
FIG. 4 is a flowchart of a signal receipt prohibition and release operation according to the embodiment.

FIG. 4 shows the procedure for the ignition switch 8 change and the communication operation (start and termination of signal receiving operation). This procedure is activated every 8 ms.

In step 301, the CPU 10 determines if the ignition switch 8 is deactuated. If so, step 302 resets the flag to "0" and step 303 performs the prohibition (termination) of the receipt of signals. Afterwards, when the ignition switch 8 is actuated, control goes from step 304 to step 305 which determines if flag is "0" or not. Here, to put it more concretely, the detection of the actuation of the ignition switch 8 is performed by monitoring the electrical voltage at the downstream side of the ignition switch 8 along the electric power line 6, comparing such monitored voltage with a predetermined voltage and determining that the ignition switch 8 is actuated when the monitored voltage is greater than the predetermined voltage. Because the flag is initially "0", in step 306, the CPU 10 determines if 400 ms have passed since the ignition switch 8 was actuated. Because 400 ms have not yet lapsed during that time immediately after the actuation of the ignition switch 8, step 303 prohibits the receipt of signals so that the receipt of signals is not executed.

Steps 301→304→305→306→303 are iterated and when 400 ms lapses after the change of the ignition switch to the on state from the off state, control goes from step 306 to step 307 which sets the flag to "1" and then to step 308 which allows (enables) the receipt of signals.

Hereinafter, steps 301→304→305 are repeated.

FIGS. 5A–5D show timing charts of the signal receipt prohibition of the communication operation and the relay control. When the ignition switch 8 is deactuated at the t1 timing as shown in FIG. 5A, receipt of signals is prohibited as shown in FIG. 5D due to the process of steps 301→302→303 of FIG. 4. Then, after the deactuation of the ignition switch 8, when the coolant water temperature decreases by less than 3° C. in 10 seconds as shown in FIG. 5B, the relay contact 15a of the relay 15 is released at the t2 timing of FIG. 5C due to the process of steps 201→202→203→205 of FIG. 3.

Meanwhile, FIGS. 6A–6D show the case when the ignition switch 8 is actuated while the relay contact 15a of the relay 15 remains closed.

When the ignition switch 8 is deactuated at the t10 timing as shown in FIG. 6A, the receipt of signals is prohibited as shown in FIG. 6D due to the process of steps 301→302→303 of FIG. 4. Then, when the ignition switch 8 is actuated at the t11 timing before the disconnection of the relay 15 as shown in FIG. 6C, the prohibition of signal receipt is continued for 400 ms due to the iteration of the process of steps 301→304→305→306→303 of FIG. 4 and the signal receipt prohibition is released at the t12 timing of FIG. 6D due to the process of steps 301→304→305→306→307→308.

Erroneous malfunction diagnosis is avoided here by prohibiting the receipt of signals during the 400 ms after the actuation of the ignition switch 8 (i.e., the t11 timing of FIG. 6A). In short, the other ECUs 2, 3, 4 cannot begin communication operations immediately after the actuation of the ignition switch 8 because of delays in the onset of electric power, delays in the initialization procedure of the RAM or the like. Therefore, even though there is no actual irregularity if signal receipt is allowed at the t11 timing, an irregularity is determined if the operation confirmation message cannot be received within the predetermined time with this process, but this is avoided by the provision of 400 ms of delay time.

In this way, for the present embodiment, malfunction diagnosis operations after the deactuation of the ignition switch 8 are prohibited by prohibiting communication operations between the engine control ECU 1 (electronic control device) which is supplied with electric power and the ECUs 2, 3, 4 which are not supplied with electric power. That is, malfunction diagnosis operations are prohibited by providing the engine control ECU 1 with a communication prohibition function for prohibiting communication operations after the deactuation of the ignition switch 8. Accordingly, malfunction diagnosis operations are not executed by the engine control ECU 1 and engine output torque is properly computed without using the default value (standard value) as backup during the engine output torque computation procedure. As a result, for a predetermined period of time (when the cooling fan is being driven) after the deactuation of the ignition switch 8, during engine operation, engine output torque control (e.g., fuel injection amount control and ignition timing control) can be performed accurately.

Also, the communication prohibition between the other ECUs 2, 3, 4 is released after the deactuation of the ignition switch 8 when a predetermined time lapses after the ignition switch 8 actuates while the engine control ECU 1 is being supplied with electric power. Thus, even if ECUs 2, 3, 4 are supplied with electric power after the actuation of the ignition switch 8, the engine control ECU 1 does not commence communication operations immediately and because the communication prohibition is lifted only after the lapse of a predetermined time period, erroneous malfunction diagnosis operations due to electric power onset delays, delays due to the initialization of the RAM and the like can be avoided.

It must be noted here that while malfunction diagnosis operations are prohibited by prohibiting the receipt of signals during communication for the above-described embodiment, as other constructions for the present invention, it is also possible that the communication operations between the engine control ECU 1 that is supplied with electric power and the other ECUs 2, 3, 4 which are not supplied with electric power remain allowed while prohibiting operations (e.g., a determination operation) subsequent to the communication operation to prohibit malfunction diagnosis operations. In other words, the process of step 303 can be a "malfunction determination prohibition" and the process of step 308 can be a "release of the malfunction determination prohibition".

Also, as a communication prohibition procedure, the entire communication circuit can also be deactuated using hardware.

Furthermore, while the ignition key is used as the key switch for the automobile equipped with a gasoline engine, the key switch may be used with electric automobiles or the like.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A vehicular controller comprising:
a first electronic control device and at least one additional electronic control device, each of said control devices being for exchanging information with others of said electronic control devices and for performing malfunction diagnosis with others of said electronic control devices, at least one of said electronic control devices additionally being for executing backup operations responsive to detection of a malfunction in one of said electronic control devices; and
a switch for selectively supplying electrical power to said additional electronic control devices in an actuated state and for terminating electrical power to said additional control devices in a deactuated state, said first electronic control device receiving electrical power even when said switch is in said deactuated state.

2. The vehicular controller of claim 1, wherein said first electronic control device comprises malfunction diagnostic prevention means for prohibiting communications between said first electronic control device and said at least one additional electronic control device to prevent said first electronic control device from performing malfunction diagnostic operations on said at least one additional electronic control device when electrical power to said at least one additional electronic control device is terminated by said switch.

3. The vehicular controller of claim 2, wherein said first electronic control device further comprises malfunction diagnostic prohibition enabling means for enabling communication between said first electronic control device and said at least one additional electronic control device a a predetermined amount of time after said switch changes from said deactuated state to said actuated state and supplies electrical power to said at least one additional electronic control device.

4. The vehicular controller of claim 1, wherein said first electronic control device comprises malfunction diagnostic prevention means for prohibiting communications between said first electronic control device and said at least one additional electronic control device to prevent said first electronic control device from performing malfunction diagnostic operations on said at least one additional electronic control device subsequent to a communication from said at least one additional electronic control device when electrical power to said at least one additional electronic control device is terminated by said switch.

5. A vehicular controller comprising:
a first electronic control device and at least one additional electronic control device, each of said control devices being for exchanging information with others of said electronic control devices and for performing malfunction diagnosis with others of said electronic control devices; and a switch for selectively supplying electrical power to said additional electronic control devices in an actuated state and for terminating electrical power to said additional control devices in a deactuated state, said first electronic control device receiving electrical power even when said switch is in said deactuated state.

6. The vehicular controller of claim 5, at least one of said electronic control devices additionally being for executing backup operations responsive to detection of a malfunction in another one of said electronic control devices when a communication from said another one of said electronic control devices is not received within a predetermined period of time.

7. The vehicular controller of claim 5, further comprising:

power supplying means for supplying power to said first electronic control device after said switch enters said deactuation mode, said first electronic control device executing a control process when receiving power from said power supplying means after said switch enters said deactuation mode;

wherein said first electronic control device includes power supply termination means for terminating power supply from said power supplying means responsive to termination of said control process.

8. The vehicular controller of claim 5, wherein said first electronic control device comprises malfunction diagnostic prevention means for prohibiting communications between said first electronic control device and said at least one additional electronic control device to prevent said first electronic control device from performing malfunction diagnostic operations on said at least one additional electronic control device when electrical power to said at least one additional electronic control device is terminated by said switch.

9. The vehicular controller of claim 8, wherein said first electronic control device further comprises malfunction diagnostic prohibition enabling means for enabling communication between said first electronic control device and said at least one additional electronic control device a a predetermined amount of time after said switch changes from said deactuated state to said actuated state and supplies electrical power to said at least one additional electronic control device.

10. The vehicular controller of claim 5, wherein said first electronic control device comprises malfunction diagnostic prevention means for prohibiting communications between said first electronic control device and said at least one additional electronic control device to prevent said first electronic control device from performing malfunction diagnostic operations on said at least one additional electronic control device subsequent to a communication from said at least one additional electronic control device when electrical power to said at least one additional electronic control device is terminated by said switch.

11. The vehicular controller of claim 5, wherein said first electronic control device is additionally for driving a cooling fan to cool a vehicle engine after said switch enter said deactuated state.

12. The vehicular controller of claim 11, further comprising:

an engine coolant temperature sensor;

wherein said first electronic control device includes fan drive termination means for terminating driving of said cooling fan when said engine cools by at least a predetermined amount within a predetermined time period.

13. The vehicular controller of claim 5, further comprising:

an inlet air volume control valve for controlling an inlet air volume during engine idling;

wherein said first electronic control device is additionally for controlling said inlet air volume control valve after said switch enters said deactuated state.

* * * * *